(12) United States Patent
Rosenholtz

(10) Patent No.: US 10,599,968 B2
(45) Date of Patent: Mar. 24, 2020

(54) MULTI-LAYER PRODUCT WITH NFC/RFID TAGS AND RF SHIELDING

(71) Applicant: Abraham Rosenholtz, Far Rockaway, NY (US)

(72) Inventor: Abraham Rosenholtz, Far Rockaway, NY (US)

(*) Notice: Subject to any disclaimer, the term of this patent is extended or adjusted under 35 U.S.C. 154(b) by 0 days.

(21) Appl. No.: 15/786,412

(22) Filed: Oct. 17, 2017

(65) Prior Publication Data

US 2018/0121780 A1    May 3, 2018

Related U.S. Application Data

(60) Provisional application No. 62/413,492, filed on Oct. 27, 2016.

(51) Int. Cl.
*G06K 19/077* (2006.01)
*H05K 9/00* (2006.01)
(Continued)

(52) U.S. Cl.
CPC ..... *G06K 19/07749* (2013.01); *G06K 19/025* (2013.01); *G06K 19/07327* (2013.01);
(Continued)

(58) Field of Classification Search
CPC .................................................. G06K 19/07749
(Continued)

(56) References Cited

U.S. PATENT DOCUMENTS

2005/0140794 A1* 6/2005 Yahagi ............... H04N 1/00236
                                                            348/211.2
2009/0121880 A1* 5/2009 Joyce, Jr. ............. B65C 9/1865
                                                            340/572.8
(Continued)

OTHER PUBLICATIONS

Smart Book, Fabiano Marinho and Orange Santos, You Tube video uploaded Feb. 19, 2014; available at https://www.youtube.com/watch?v=WPLGQa7j59k&feature=youtu.be.
(Continued)

*Primary Examiner* — Allyson N Trail
(74) *Attorney, Agent, or Firm* — Gordon & Jacobson, P.C.

(57) ABSTRACT

An NFC tag shielding system for a multi-layer product of printed and/or non-printed layered material(s) includes a plurality of layers of printed and/or non-printed materials. The system includes a first on-metal NFC tag applied to a first layer of material of the plurality of layers and a second on-metal NFC tag applied to a second layer of material of the plurality of layers. The first and second on-metal NFC tags are aligned along an axis perpendicular to planes of the first and second layers of material. The system also includes an RF shielding layer disposed between the first and second on-metal NFC tags. The RF shielding layer is positioned along the axis and extends parallel to the first and second layers of material a distance covering at least a projected area of the larger of the first or second on-metal NFC tag. The RF shielding layer provides signal shielding between the NFC tags so that a user wishing to read the first NFC tag on the first layer of material will not unintentionally read the aligned second NFC tag on the second layer of material.

34 Claims, 5 Drawing Sheets

(51) Int. Cl.
*G06Q 20/32* (2012.01)
*G06K 19/073* (2006.01)
*G06K 19/02* (2006.01)
*G07G 1/00* (2006.01)
*G07F 7/12* (2006.01)

(52) U.S. Cl.
CPC ... *G06K 19/07722* (2013.01); *G06Q 20/3278* (2013.01); *G07F 7/125* (2013.01); *G07G 1/009* (2013.01); *H05K 9/0073* (2013.01)

(58) Field of Classification Search
USPC ........................................ 235/380; 705/14.26
See application file for complete search history.

(56) References Cited

U.S. PATENT DOCUMENTS

| | | | | |
|---|---|---|---|---|
| 2009/0191531 | A1* | 7/2009 | Saccocci | G09B 5/062 434/317 |
| 2009/0278692 | A1* | 11/2009 | Alzaabi | G06K 17/0022 340/572.8 |
| 2011/0040757 | A1* | 2/2011 | Kossi | G06F 17/3002 707/737 |
| 2012/0310720 | A1* | 12/2012 | Balsan | G06Q 20/204 705/14.26 |
| 2013/0307687 | A1 | 11/2013 | Kay | |
| 2015/0161424 | A1* | 6/2015 | Nevid | G06Q 30/0259 340/10.1 |
| 2016/0328639 | A1* | 11/2016 | Cohn | G06K 19/07749 |

OTHER PUBLICATIONS

Using QR Codes to Expand the Reading Experience, The Book Designer, Jun. 10, 2011, available at https://www.thebookdesigner.com/2011/06/using-qr-codes-to-expand-the-reading-experience/.

NFC Anti-Metal PVC Stickers—Fully Waterproof, TAG NFC Wholesale, https://www.tagnfc.com/en/shop/70-nfc-anti-metal-pvc-stickers-fully-waterproof; archived on Nov. 14, 2015 at https://web.archive.org/web/20151114040609/https://www.tagnfc.com/en/shop/70-nfc-anti-metal-pvc-stickers-fully-waterproof.

QR Codes in Books: Make your textbook interactive, Gautam Garg, Jun. 17, 2015, Scanova Blog, available at https://scanova.io/blog/blog/2015/06/17/qr-codes-books-author-publisher/.

Balloon book adds multimedia with integrated NFC tags, Sarah Clark, NFC World, Sep. 26, 2012, available at https://www.nfcworld.com/2012/09/26/318132/balloon-book-adds-multimedia-with-integrated-nfc-tags/.

Embedded RFID Tags Help Make This Book a Good Read, Claire Swedberg, RFID Journal, Oct. 10, 2012, available at http://www.rfidjournal.com/articles/view?10010.

* cited by examiner

MULTI-LAYER PRODUCT WITH NFC/RFID TAGS AND RF SHIELDING

CROSS-REFERENCE TO RELATED APPLICATION

This application claims the benefit of U.S. Provisional Patent Application No. 62/413,492, filed on Oct. 27, 2016, which is hereby incorporated herein by reference in its entirety.

BACKGROUND

1. Field

The following disclosure relates to multi-layer products including printed and/or non-printed layered material(s) with NFC tags and RF (radio frequency) shielding.

2. State of the Art

Near-field communication (NFC) relates to a set of communication protocols that enable two electronic devices to establish communication by bringing them within about 5 cm (2 in) of each other. The electronic devices may include at least one active, powered NFC-enabled electronic device, such as a smartphone or tablet, which can communicate with a passive NFC-enabled devices, such as an "NFC tag", which may be powered inductively by the active device. As used herein, "active NFC-enabled device" refers to an active or electrically powered NFC-enabled electronic device, such as smartphone or tablet computer, which can be provided with hardware and software for communicating with at least one of another active NFC-enabled device and a passive NFC-enabled device. As used herein, "NFC tags" refer passive data stores which can be read, and, under some circumstances, written to by an active NFC-enabled device. The stored data on the NFC tag may contain any form of data, but common applications are for storing URLs from where the NFC device may find further information. NFC tags can be attached to objects, such as posters. When an active NFC-enabled device has Internet connectivity, such as a smartphone, it may use information obtained from the passive NFC-enabled device for communication with online services.

The NFC tag is a passive device with no power of its own. Accordingly, when one is used, the users brings an active NFC-enabled device into close proximity to (or contacts) the NFC tag. The active NFC-enabled device and the NFC tag each have a loop antenna that may be used to transmit power inductively from the active NFC-enabled device to the NFC tag to provide power to the NFC tag to power its electronics for communication with the active NFC-enabled device. When the NFC tag is powered, it is enabled to transfer information from the NFC tag to the reader/writer of the active NFC-enabled device. Specifically, to communicate between NFC-enabled devices, NFC uses electromagnetic induction between loop antennae of respective NFC devices—for example a loop antenna of a smartphone and a loop antenna of an NFC tag. Although normally only a small amount of data may be transferred, the data may be used to direct the active NFC-enabled device to a website URL, for example.

Each active NFC-enabled device can work in three modes: NFC card emulation—enables active NFC-enabled devices such as smartphones to act like "smart cards", allowing users to perform transactions such as payment or ticketing; NFC reader/writer, which enables active NFC-enabled devices to read information stored on inexpensive NFC tags embedded in labels or smart posters; and NFC peer-to-peer, which enables two active NFC-enabled devices to communicate with each other to exchange information in an ad-hoc fashion.

There are four basic NFC tag types that have been defined: Type 1; Type 2; Type 3; and Type 4. Each of the four tag types has a different format and capacity. These NFC tag type formats are based on ISO 14443 Types A and B which is the international standard for contact-less smartcards, and Sony FeliCa which conforms to ISO 18092, the passive communication mode, standard. The different NFC tag type definitions are as follows.

The NFC Type 1 tag 1 is based on the ISO14443A standard. These NFC tags are read and re-write capable and users can configure the tag to become read-only. Memory availability is 96 bytes which is more than sufficient to store a website URL or other small amount of data. However, the memory size is expandable up to 2 kbyte. The communication speed of a NFC Type 1 tag is 106 kbit/s. As a result of its simplicity, NFC Type 1 tags are cost effective and used for many NFC applications.

The NFC type 2 tag is also based on ISO14443A. These NFC tags are read and re-write capable and users can configure the tag to become read-only. The basic memory size of this tag type is only 48 bytes although this can be expanded to 2 kbyte. Again the communication speed is 106 kbit/s.

The NFC Type 3 tag is based on the Sony FeliCa system. It currently has a 2 kbyte memory capacity and the data communications speed is 212 kbit/s. Accordingly, the NFC Type 3 tag is more applicable for more complex applications, although there is a higher cost per tag.

The NFC Type 4 tag is defined to be compatible with ISO14443A and B standards. These NFC tags are pre-configured at manufacture and they can be either read/re-writable, or read-only. The memory capacity can be up to 32 kbytes and the communication speed is between 106 kbit/s and 424 kbit/s.

NFC tags may also be differentiated based on the type of material to which they can be attached. For example, an "on-metal" NFC tag is a type of NFC tag that is specifically configured to be attached to a metal surface or an object having metal components. An example of an on-metal tag is "on-metal NFC Stickers Ntag203" available at Tagnfc.com. Typically, on-metal tags include a layer of ferrite to prevent signals from an active NFC-enabled device from reflecting from the metal surface or object to which the NFC tag is attached.

An example of a book that incorporates eight NFC tags is "Catch the Sun" authored by Han Nabben and published by Elektor International Media. NFC tags are on the cover of the book and some of its pages. A user equipped with an NFC-enabled mobile phone or tablet can tap each NFC tag of the book and be directed to an Elector-hosted website in order to learn more about a particular topic. Also, those who buy the book can personalize the book by using a phone or tablet to encode two of the NFC tags in the book.

Another book that incorporates NFC tags is entitled "1+1" authored by Orange Santos and Fabiano Marinho and is termed a "smart book". The "1+1" book is designed to help children learn about the four mathematical operations.

In addition to NFC tags, there are additional ways of communicating with an active electronic device, such as a smartphone or tablet. For example, a barcode is a machine-readable optical label that contains information about the item to which it is attached. Another type of machine-readable optical label is a "QR code" (abbreviated from Quick Response Code), which is the trademark for a type of matrix barcode (or two-dimensional barcode) first designed for the automotive industry in Japan. The QR code system became popular outside the automotive industry due to its fast readability and greater storage capacity compared to standard UPC barcodes. Applications of QR codes include product tracking, item identification, time tracking, document management, and general marketing. A QR code consists of black squares arranged in a square grid on a white background, which can be read by an imaging device such as a camera, and processed using Reed-Solomon error correction until the image can be appropriately interpreted. Many smartphones and tablet computers have hardware and software to read QR and barcodes. An example of a book that incorporates QR codes is entitled "Raggedy Chan" authored by Camille Picott.

Also, RFID is the process by which items are uniquely identified using radio waves, and NFC is a specialized subset within the family of RFID technology. Specifically, NFC is a branch of High-Frequency (HF) RFID. NFC is designed to be a secure form of data exchange, and an NFC device is capable of being both an NFC reader and an NFC tag. This feature allows NFC devices to communicate peer-to-peer. An RFID system comprises a tag, a reader, and an antenna. The reader sends an interrogating signal to the tag via the antenna, and the tag responds with its unique information. RFID tags are either Active or Passive. Active RFID tags contain their own power source giving them the ability to broadcast with a read range. Passive RFID tags do not have their own power source. Instead, they are powered by the electromagnetic energy transmitted from the RFID reader.

SUMMARY

In accordance with one aspect, further details of which are described in greater detail below, an NFC tag shielding system for a printed publication (such as a hardcover or softcover work having printed pages, a magazine, a pamphlet, or a greeting card) is provided. The system includes a printed publication having a plurality of sheets bound together. Also, the system includes a first on-metal NFC tag applied to a first sheet of the plurality of sheets and a second on-metal NFC tag applied to a second sheet of the plurality of sheets. The first and second on-metal NFC tags are operably aligned along an axis perpendicular to parallel planes of the first and second sheets. Also, the system includes an RF shielding layer disposed between the first and second on-metal NFC tags. The RF shielding layer is positioned along the axis and extends parallel to the first and second sheets a distance covering a localized projected area of the larger of the first or second on-metal NFC tag. The RF shielding layer between the first and second NFC tags provides signal shielding between the NFC tags so that an NFC RF signal (such as from an NFC reader of an active NFC-enabled device) aimed at the first NFC tag on the first sheet will not pass through the RF shielding layer. This prevents the unintentional reading of the operably aligned second NFC tag on the second sheet.

The localized projected area covered by the RF shielding layer may be 5 to 25 percent larger than the projected area of the larger of the first or second on-metal NFC tag. In one embodiment, the RF shielding layer may be 10 percent larger.

The RF shielding layer may include metal and may be flexible. The metal may include at least one of aluminum and copper. The first on-metal NFC tag may be attached to a first side of the first sheet and the RF shielding layer may be attached to a second side, opposite the first side, of the first sheet. The first on-metal tag and the RF shielding layer may be adhesively attached to the first sheet.

At least one of the first and second NFC tags has a region on or over which indicia is displayed. The indicia may include at least one of text, image, a barcode, and a quick response code.

The system may further include a third on-metal NFC tag applied to a first sheet of the plurality of sheets, and another RF shielding layer disposed between the second and third on-metal NFC tags. The other RF shielding layer may be positioned along the axis and extending parallel to the first, second, and third sheets a distance covering a localized projected area of the larger of the first, second, or third on-metal NFC tag. The third NFC tag may have a region on or over which indicia is displayed. The indicia may include at least one of text, image, a barcode, and a quick response code. Subsequent on-metal NFC tags may be applied to respective subsequent sheets of the plurality of sheets and may be constructed in the same manner as the others described herein and may have regions on or over their respective NFC tags displaying indicia.

According to another aspect of the disclosure, an NFC tag shielding system for a book includes a book having a plurality of layers of material, a first on-metal NFC tag applied to a first layer of the plurality of layers, and a second on-metal NFC tag applied to a second layer of the plurality of layers. The first and second on-metal NFC tags are operably aligned along an axis perpendicular to planes of the first and second layers. Also, the system includes an RF shielding layer disposed between the first and second on-metal NFC tags. The RF shielding layer is positioned along the axis and extends parallel to the first and second layers a distance covering a localized projected area of the larger of the first or second on-metal NFC tag.

The localized projected area covered by the RF shielding layer may be 5 to 25 percent larger than the projected area of the larger of the first or second on-metal NFC tag. Also, the localized projected area covered by the RF shielding layer may be equal to the larger of the first layer or the second layer.

The material may include at least one of printed and non-printed material. The material may be formed from at least one of fabric, paper, vinyl, plastic, PVC, metal, wood, nylon and leather. The book may be formed from printed material bound into a hardcover or softcover work, a magazine, a pamphlet, and a greeting card.

The system may also include a third on-metal NFC tag applied to a third layer of the plurality of layers, and another RF shielding layer disposed between the second and third on-metal NFC tags. The other RF shielding layer may be positioned along the axis and extending parallel to the first, second, and third layers a distance covering a localized projected area of the larger of the first, second, or third on-metal NFC tag. The third on-metal NFC tag has a region on or over which indicia is displayed.

Subsequent on-metal NFC tags may be applied to subsequent layers of the plurality of layers and may be constructed in the same manner as the others described herein and may have regions on or over their respective NFC tags displaying indicia.

According to yet another aspect of the disclosure, an NFC tag shielding system for a multi-layered product includes a plurality of layers of printed and/or non-printed material, a first on-metal NFC tag applied to a first layer of the plurality of layers, and a second on-metal NFC tag applied to a second layer of the plurality of layers.

The first and second on-metal NFC tags are operably aligned along an axis perpendicular to planes of the first and second layers. Also, the system includes an RF shielding layer disposed between the first and second on-metal NFC tags. The RF shielding layer is positioned along the axis and extends parallel to the first and second layers a distance covering a localized projected area of the larger of the first or second on-metal NFC tag.

The system may include a third on-metal NFC tag applied to a third layer of the plurality of layers, and another RF shielding layer disposed between the second and third on-metal NFC tags. The other RF shielding layer is positioned along the axis and extends parallel to the first, second, and third layers a distance covering a localized projected area of the larger of the first, second, or third on-metal NFC tag.

The third on-metal NFC tag has a region on or over which indicia is displayed. The material may be formed from at least one of fabric, paper, vinyl, plastic, PVC, metal, wood, nylon and leather. The layers may also be formed as plastic payment cards, such as credit and debit cards, or plastic or paper playing cards. The layers may be bound together or may be unbound.

Subsequent on-metal NFC tags may be applied to subsequent layers of the plurality of layers and may be constructed in the same manner as the others described herein and may have regions on or over their respective NFC tags displaying indicia.

DETAILED DESCRIPTION

Figure 1:
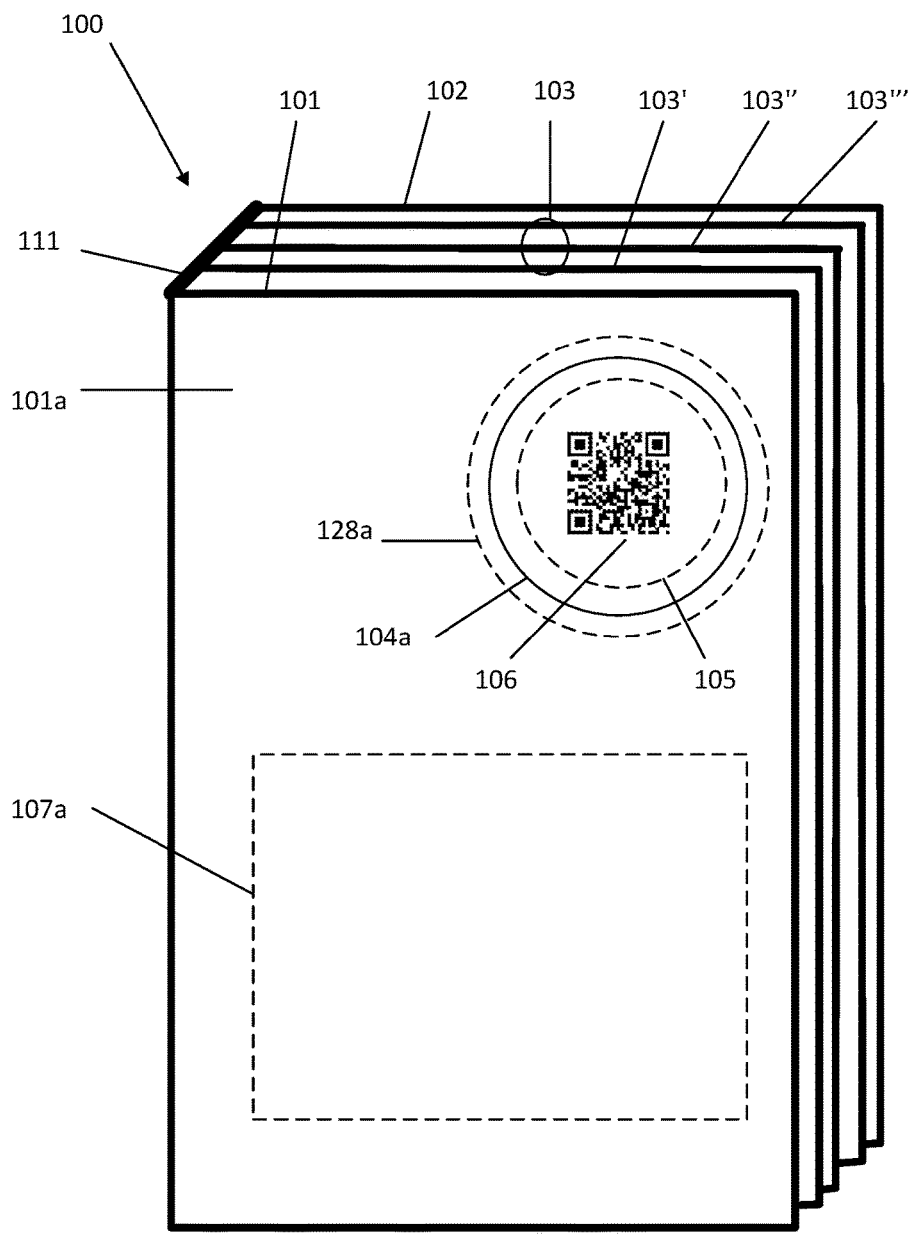
FIG. 1 is a perspective illustration of a book in accordance with an aspect of the disclosure.

FIG. 1 shows an NFC tag shielding system 100 for a multi-layered product (e.g., a book) that includes a plurality of layers 101, 102, 103 of printed and/or non-printed material, a first on-metal NFC tag 104a applied to a first layer 101 of the plurality of layers, and a second on-metal NFC tag 104b applied to a second layer 103' of the plurality of layers. Specifically, FIG. 1 shows a view of the book 100 having a front cover 101, a back cover 102, and a plurality of pages 103 between the covers 101 and 102. As used herein "book" refers to a bound volume of printed and/or non-printed layered material. The binding of the layered material may include permanent and non-permanent couplings between the layers of the material. Permanent coupling refers to connections that cannot be physically undone without cutting, tearing, or otherwise breaking the connections so that they cannot be used again to reconnect. Non-permanent coupling refers to connections that can be physically undone without cutting, tearing, or otherwise breaking the connections so that the connections can be used again to reconnect. As used herein, printed layers and non-printed layers may be formed of the same or different materials, such as fabric, paper, vinyl, plastic, PVC, metal, wood, nylon and leather. For example, paper may be printed upon or not printed upon. Thus, as used herein, a "book" may encompass a paperback novel as well as a swatch book of fabric samples. While a bound book is described, it will be appreciated that a binding is merely illustrative.

The pages 103 and covers 101 and 102 of the book 100 may be bound and connected at a spine 111, such as by conventional bookbinding techniques. The pages/covers may also be bound into one of a magazine, pamphlet, or greeting card. As noted above, the materials forming the covers 101, 102, and pages 103 may include paper as well as many other materials, including, without limitation, fabric, vinyl, plastic, PVC, metal, wood, nylon and leather.

Figure 2:
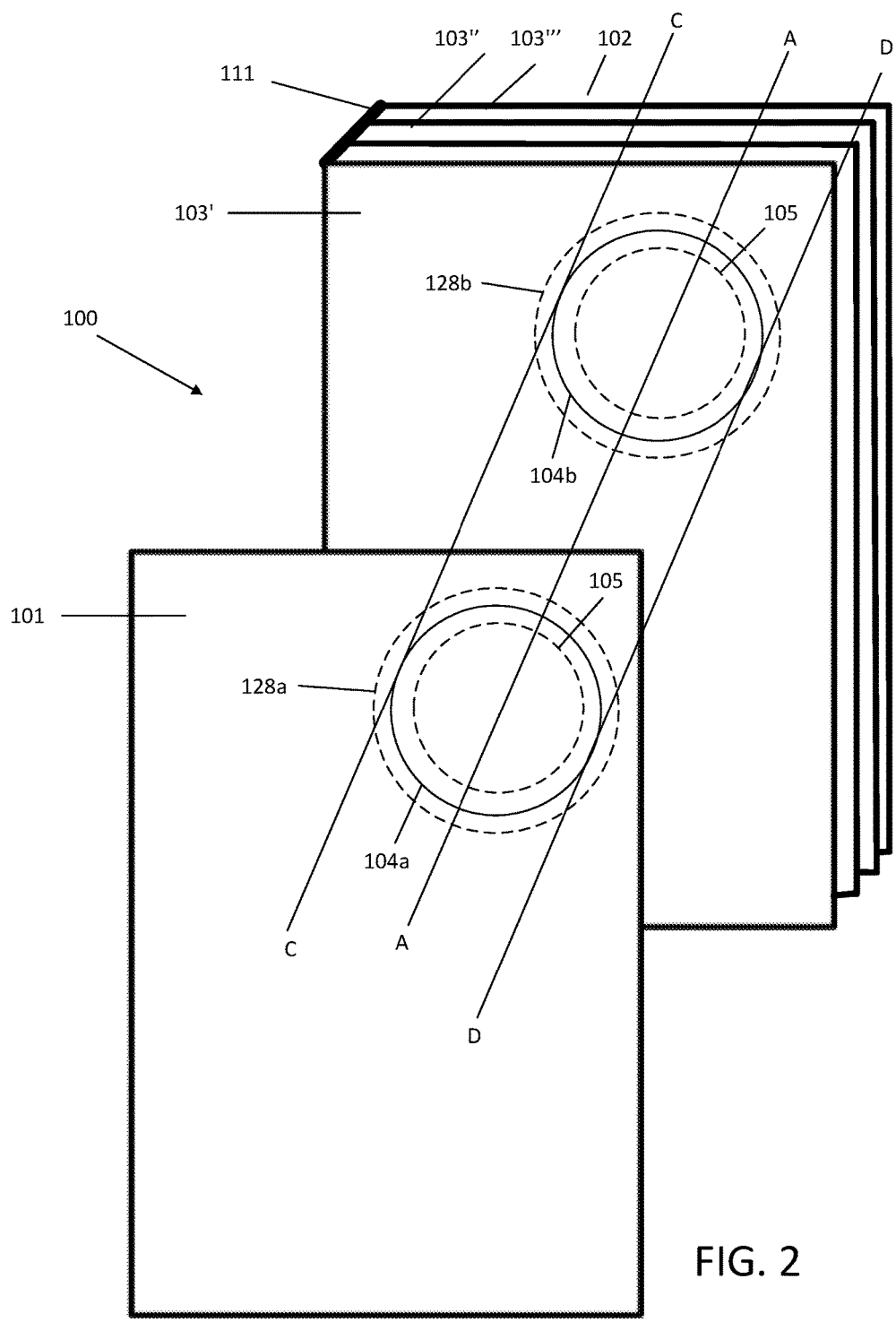
FIG. 2 is an exploded assembly view of the book of FIG. 1 with a front cover separated from the book.

As shown in FIGS. 1 and 2, the book 100 incorporates a plurality of NFC tags 104a and 104b. Additional NFC tags may be included, such as tag 104c as shown in FIG. 5. In the example shown in FIGS. 1 to 5, a first NFC tag 104a is located on (attached to) the cover 101, a second NFC tag 104b is located on (attached to) page 103' of the book 100, and a third NFC tag 104c is located on (attached to) page 103" of the book 100. The consecutive pagination of the NFC tags 104a, 104b, and 104c is not critical and is shown merely for illustrative purposes and ease of explanation. Indeed, the tags 104a, 104b, and 104c may be spaced by one or more pages 103 without deviating from the inventive concepts presented herein.

Figure 3:
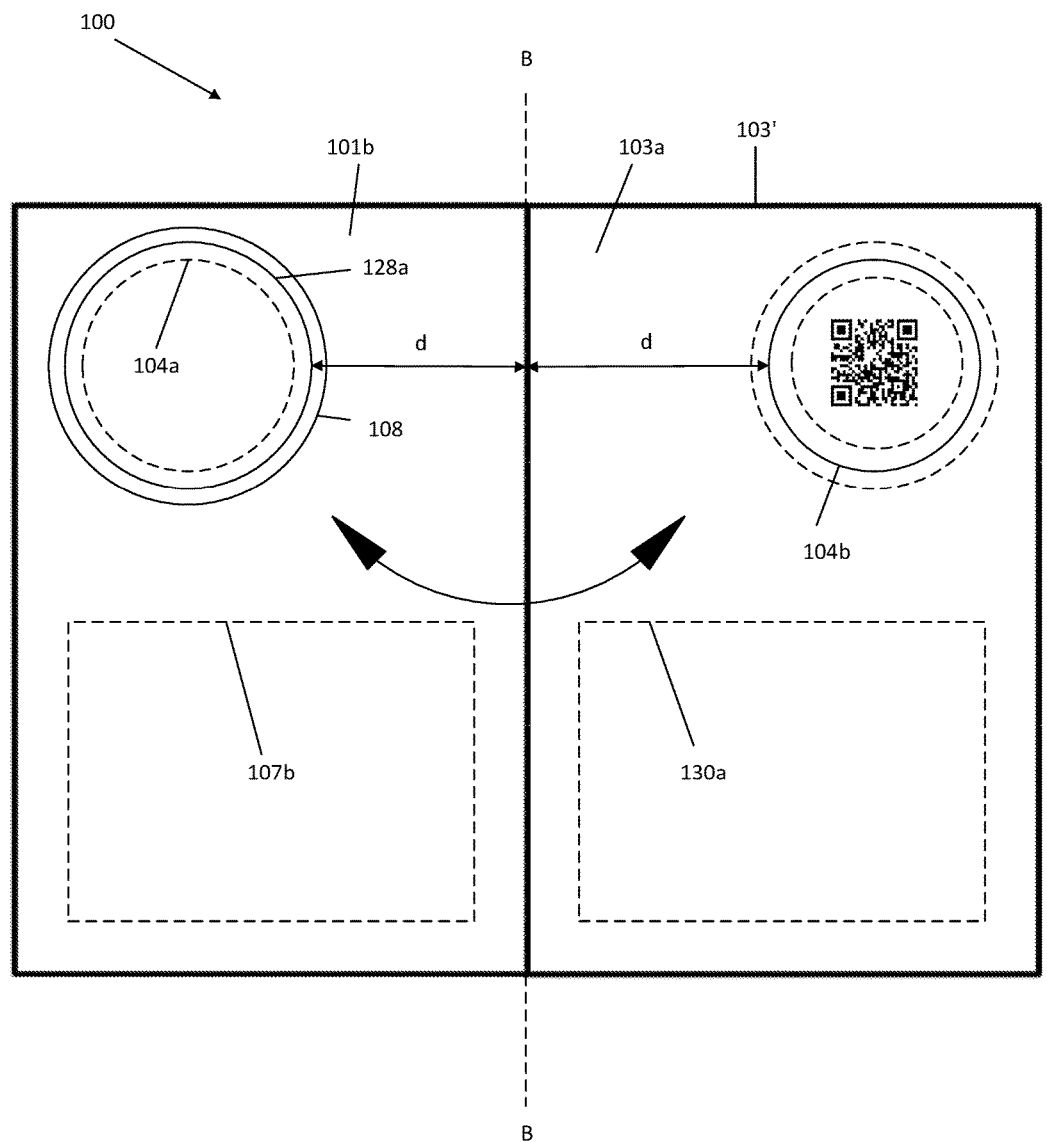
FIG. 3 is an illustration of the book of FIG. 1 opened to a first page of the book.

In the example shown in FIGS. 1 to 5, the NFC tags 104a, 104b, and 104c are attached to the book 100 so that the NFC tags 104a, 104b, and 104c are operably aligned along the axis A-A so that they project onto each other between lines C-C and D-D when the book 100 is closed, as shown in FIGS. 1 and 2. As used herein, "operably aligned" denotes that the NFC tags 104a, 104b, and 104c can be coaxially aligned with one another during use of the book by a user, either when the book 100 is closed or opened. When the front cover 101 is turned to read page 103', as shown in FIG. 3, the first tag 104a and the second tag 104b will not be operably aligned, and will be spaced equidistantly a distance "d" with respect to an axis B-B through the spine 111. As noted above, the first, second, and third tags 104a, 104b, and 104c are operably aligned and substantially overlap one another (their projected areas overlap within about 10% of one another) along axis A-A when the book 100 is closed, as shown in FIGS. 1 and 2. Other NFC tags may be attached to the book 100 that cannot be operably aligned with NFC tags 104a, 104b, and 104c. For example, an NFC tag placed in an opposite corner of the front cover 101 from tag 104a would be considered to be placed in a location that cannot be operably aligned with NFC tags 104a, 104b, and 104c.

The NFC tags 104a, 104b, and 104c are shown as being circular discs, although other shapes, such as square and oval, are possible, for example. Each tag 104 may have a region 105 on which indicia 106, such as a QR code, bar code, text, or image may be displayed. The indicia 106 may be printed directly on an outer layer of the NFC tags 104a, 104b, and 104c, or may be displayed on an adhesive label which can be applied to the NFC tag 104. Alternatively, the indicia 106 may be printed or otherwise displayed on a separate sheet (not shown) and displayed in a region of that sheet corresponding to region 105 on the front cover 101.

The front cover 101 of the book 100 also has a region 107a for displaying text or other indicia. With the exception of the region 105, the region 107a may cover the entire first side 101a of the front cover 101. Also, when a separate sheet is used to cover the NFC tag, as described above, the separate sheet may also include a region for displaying indicia corresponding to region 107 of the front cover 101. Such a separate sheet bearing the indicia 106 over region 105 and indicia over region 107a may be applied or otherwise attached to the front cover 101 to cover the corresponding regions 105 and 107a on the front cover 101 as well as cover the first tag 104a.

FIG. 3 shows the book 100 when the front cover 101 is turned to open the book to page 103'. An indicia bearing region 107b may be provided on a second side 101b of the front cover 101. The region 107b may extend up to the edges of the second side 101b of the front cover 101. Any of the pages 103', 103", and 103'" may be configured in exactly the same manner as the front cover 101, though only the details of page 103' are shown in FIG. 3. Thus, page 103' has a first side 103'a having an indicia bearing region 130a on its first side having the same features as corresponding region 107a of first side 101a of the front cover 101. Similarly, page 103" has a first side 103"a having an indicia bearing region on its first side having the same features as corresponding region 107a of first side 101a of the front cover 101.

As described in greater detail below, an RF shielding layer 128a covers a projected localized area behind the first NFC tag 104a. The RF shielding layer 128a may extend to cover an area that is slightly larger than that projected localized area, such as ten percent larger. Also, the RF shielding layer 128a may extend even further to the edges of the second side 101b of the front cover 101. The RF shielding layer 128a may be attached directly to the second side 101a of the front cover 101. The RF shielding layer 128a is covered by a layer 108 of paper, which may cover at least the area of the RF shielding layer 128a or may extend up to the entire second side 101b of the front cover 101.

Typically, NFC tags that are applied to non-metallic objects (e.g., paper, cardboard, and paperboard) are not magnetically or electrically shielded from one another. However, if the tags 104a and 104b, which are operably aligned along axis A-A, are not shielded from one another, then a situation may arise where a signal 142 (FIG. 4) emitted by an NFC reader of an active NFC-enabled device 140 (FIG. 4) aimed at tag 104a on the cover 101 may inadvertently communicate with the second tag 104b, because the signal 142 may pass through the first tag 104a to the second tag 104b. To mitigate this situation, the tags 104a, 104b, and 104c can be electromagnetically shielded from each other using RF shielding layers as described in greater detail below.

In one embodiment the NFC tags 104a and 104b used are "on-metal" tags. In the case of the book 100, the pages 103 and covers 101 and 102 are paper-based and non-metallic. Thus, for the on-metal tags to operate as-designed, an RF shielding layer 128a is interposed between the first NFC tag 104a and the second NFC tag 104b and an RF shielding layer 128b is interposed between the second NFC tag 104b and the third NFC tag 104c, as will be described in further detail below. Thus, for example, the combination of the on-metal tags 104a and 104b and RF shielding layer 128a therebetween prevents signal 142 from reaching the second tag 104b in the arrangement shown in FIG. 4.

The RF shielding layers described herein 128a, 128b can be formed from various materials. For example, the RF shielding layers 128a and 128b may be formed from a metal sheet or flexible foil, such as aluminum and copper. Copper may be used for radio frequency (RF) shielding because it absorbs radio and magnetic waves.

Also, aside from metal sheets, some fabrics or papers woven with conductive materials (e.g., copper or other metals), and some paint having metallic ink applied to fabrics or papers may be used. In addition, other materials that may be used for the RF shielding layers 128a and 128b include metal screen or mesh and metal foam. Any holes in the screen, mesh, and foam must be significantly smaller than the wavelength of the RF radiation that is being kept out, or the layers 128a and 128b formed of those materials will not effectively approximate an unbroken conducting surface.

Also, the RF shielding layers 128a and 128b may be formed by coating the pages 103 and/or covers 101 and 102 with a metallic ink or similar material that includes a carrier material loaded with a suitable metal, typically copper or nickel, in the form of very small particulates. Alternatively, such metallic ink may be applied to a separate sheet that is applied to the pages 103 and/or covers 101 and 102 of the book 100 provided that such applied pages are positioned between respective NFC tags sought to be shielded from each other. Such metallic ink may be applied (e.g., sprayed or printed) on to the pages 103 and/or covers 101 and 102, and, once dry, produces a continuous conductive layer of metal, which can be providing effective RF shielding.

Figure 4:
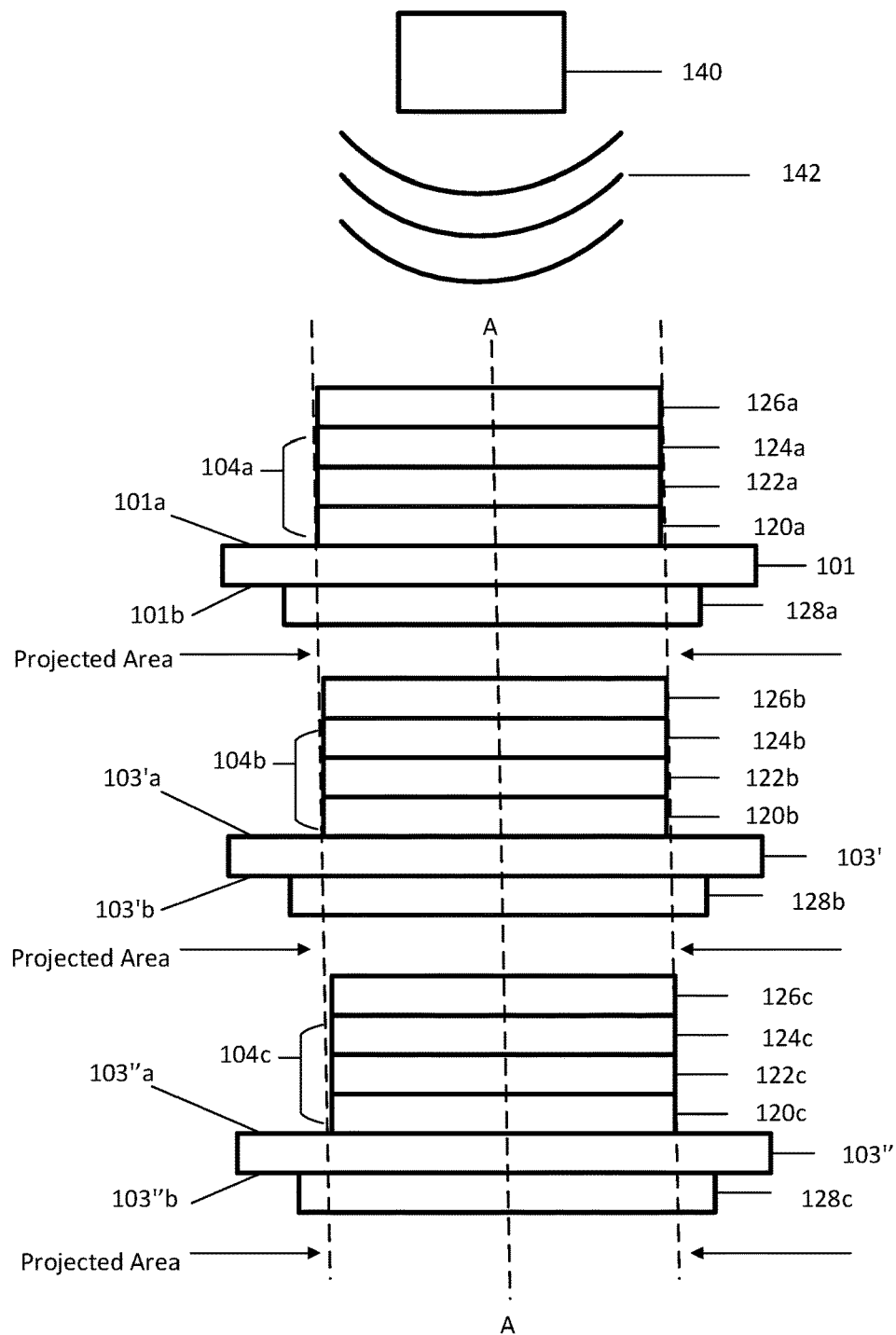
FIG. 4 is a schematic illustration showing details of NFC tags incorporated into the book of FIG. 1 and an NFC tag reader emitting a signal at the book.
Figure 5:
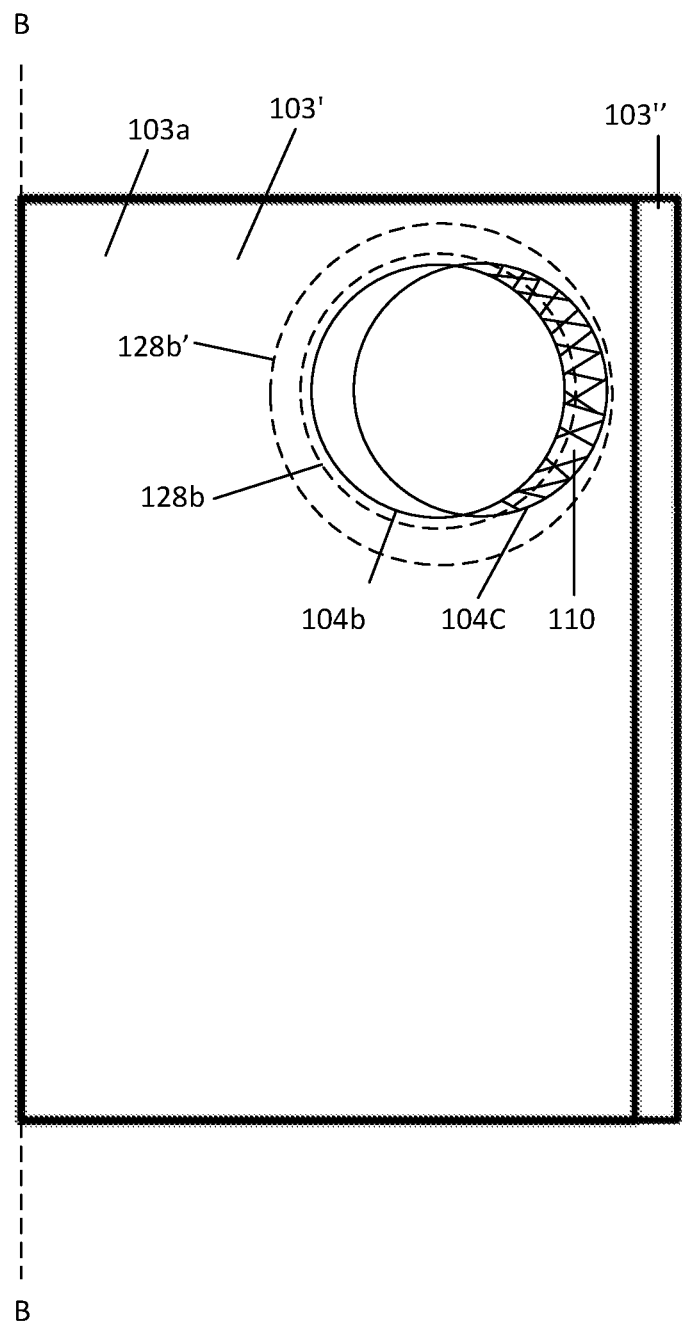
FIG. 5 is an illustration of the book of FIG. 1 opened to a first page of the book and where the pages do not align.

As shown in FIG. 4, on-metal NFC tags 104a and 104b are shown substantially aligned (within 10% of axis A-A) along axis A-A and having respective multilayer structures. Since the structures of the tags 104a, 104b, and 104c are identical, the following discussion will be directed to tag 104a. Beginning from the bottom of the first tag 104a in FIG. 4, the NFC tag 104a includes an adhesive layer 120a for attaching the NFC tag 104a to a front side 101a of the front cover 101 of the book 100. In the case of the "on metal NFC Stickers Ntag203", the adhesive is an adhesive manufactured by 3M of St. Paul Minn. Above and adjacent to the adhesive layer 120a is a magnetic permeable layer 122a (e.g., ferrite layer), which concentrates a magnetic field induced by the signal 142 at the magnetic permeable layer 122a. Above and adjacent the magnetic permeable layer is a layer 124a having an antenna inlay with an integrated circuit (not shown). Optionally, a label 126a covers layer 124a of the first NFC tag 104a. The label 126a is located in indicia bearing region 105 in FIG. 1.

The aforementioned RF shielding layer 128a is attached to (FIG. 4) or spaced near the second side 101b of the front cover 101. The RF shielding layer 128a may have an adhesive backing to attach to second side 101b of the front cover 101. The RF shielding layer 128a is sized and positioned so that it projects over at least all of the NFC tag 104a on the first side of the cover 101, as shown in FIGS. 3 and 4. As noted above, the RF shielding layer 128a may extend beyond the dimensions of the NFC tag 104a, such as by at least 10%. Thus, if the NFC tag 104a is a disc shaped element having a diameter of 30 millimeters, the RF shielding layer may have a diameter of at least 33 mm.

It will be appreciated that the RF shielding layer 128a need not be directly attached to the same page or cover to which the NFC tag 104a is attached. For example, the sheet 108 may extend to the edges of the second side 101b and may be adhesively attached only along the edges of the sheet 108 so that a pocket is formed between the second side 101b and the sheet 108. The RF shielding layer 128a may be inserted into that pocket which is later sealed closed to retain the RF shielding layer 128a in the pocket. Moreover, the RF shielding layer 128a may be located anywhere along axis A-A between the NFC tag 104a and 104b, such as on an intermediate page between the cover 101 and page 103'. In other words, there is no requirement that a respective RF shielding layer be adjacent to or otherwise attached to a cover or a page bearing an NFC tag. Thus, if NFC tags are spaced by multiple pages in a book, the RF shielding layer may be located on any page between the pages of the book bearing the NFC tags.

While an RF shielding layer provides shielding between NFC tags, a ground plane directly beneath magnetic or electric fields will very much degrade them. Hence, performance of the NFC inductive antenna in layer 124*a* can degrade if it were placed directly in contact with or adjacent to the RF shielding layer 128*a*. In the example shown in FIG. 4, the RF shielding layer 128*a* acts as the metal object to which the on-metal tag 104*a* is attached. The use of the magnetic permeable layer 122*a* serves to physically space the NFC antenna layer 124*a* from the RF shielding layer 128*a* layer a sufficient amount to concentrate the magnetic fields induced by the signal 142 around the magnetic permeable layer 122*a* (i.e., closer to the antenna), which helps to mitigate performance degradation. Additionally, using a magnetic permeable layer 122*a* having a high magnetic permeability (e.g., ferromagnetic) further mitigates performance degradation. Thus, the configuration of the magnetic permeable layer 122*a* in the on-metal NFC tag 104*a* and the RF shielding layer 128*a* provide shielding between the first and second NFC tags 104*a* and 104*b* so that when the NFC reader 140 emits the signal 142 at the first NFC tag 104*a*, the signal 142 will not pass through the first NFC tag 104*a*.

FIG. 5 shows the book 100 opened to page 103'. In the example book 100, all of the pages 103', 103", 103''' are arranged identically such that they all incorporate on-metal NFC tags aligned along axis A-A. As shown in FIG. 5, however, when the book 100 is opened to page 103', it is possible that the pages will not all lie flat in alignment. For example, as shown in FIG. 5, the curvature of the pages 103' and 103" causes a slight misalignment between the NFC tags 104*b* and 104*c*. To ensure that NFC tags 104*b* and 104*c* are shielded from each other even when the NFC tags do not overlap in a region 110, the RF shielding layer 128*b* between NFC tags 104*b* and 104*c* may be enlarged to region 128*b*' to account for the region 110 caused by the spreading of the pages 103' and 103". Of course, it will be appreciated that where the RF shielding layer extends across the entire page, such issues may be completely eliminated.

There have been described and illustrated herein several embodiments of an NFC tag shielding system for a multi-layer product. While particular embodiments have been described, it is not intended that the invention be limited thereto, as it is intended that the invention be as broad in scope as the art will allow and that the specification be read likewise. Thus, while particular types of NFC tags have been disclosed, it will be appreciated that other types may be used as well. For example, while embodiments of NFC tags have been described having a magnetic permeable layer, it will be appreciated that other electronic tags that do not have such a magnetic permeable layer may be used. Also, it will be appreciated that electronic tags other than NFC tags may be used. For example, RFID tags or other similarly constructed and functioning electronic tags may be used as well. While a bound book has been described to illustrate the inventive concepts, it will be appreciated that the inventive concepts described herein are applicable more generally to a multi-layered product formed from a plurality of layers of material, whether the layers are bound or unbound. Such layers may also be formed of the same or similar materials mentioned above, i.e., fabric, paper, vinyl, plastic, PVC, metal, wood, nylon and leather. For example, the layers may be formed as plastic payment cards, such as credit or debit cards, or plastic or paper playing cards. It will therefore be appreciated by those skilled in the art that yet other modifications could be made to the provided invention without deviating from its spirit and scope as claimed.

What is claimed is:

1. An electronic tag shielding system for a printed publication comprising:
    a printed publication having a plurality of sheets bound together;
    an on-metal first electronic tag applied to a first sheet of the plurality of sheets;
    a second electronic tag applied to a second sheet of the plurality of sheets, the second sheet located below the first sheet; and
    a first RF shielding layer disposed between the first and second electronic tags, the RF shielding layer operably covering the second electronic tag,
    wherein in a configuration where the first RF shielding layer covers the second electronic tag, only the first electronic tag is readable by an electronic tag reader in range of the first electronic tag.

2. The system according to claim 1, wherein:
    the RF shielding layer is 5 to 25 percent larger than at least one of the first and second electronic tags.

3. The system according to claim 1, wherein:
    the first RF shielding layer is conductive.

4. system according to claim 3, wherein:
    the first RF shielding layer includes metal.

5. The system according to claim 1, wherein:
    the first electronic tag is attached to a first side of the first sheet and the first RF shielding layer is attached to a second side, opposite the first side, of the first sheet.

6. The system according to claim 5, wherein:
    the first electronic tag and the first RF shielding layer are adhesively attached to the first sheet.

7. The system according to claim 1, wherein:
    the printed publication is formed as one of a hardcover or softcover work having printed pages, a magazine, a pamphlet, or a greeting card.

8. The system according to claim 1, wherein:
    the sheets are formed of at least one of fabric, paper, vinyl, plastic, PVC, metal, wood, nylon and leather.

9. The system according to claim 1, further comprising:
    an on-metal third electronic tag applied to a third sheet of the plurality of sheets, the third sheet located between the first and second sheets, wherein the first RF shielding layer is located between the second and third electronic tags; and
    a second RF shielding layer disposed between the first and third electronic tags, the second RF shielding layer operably covering the third electronic tag.

10. The system according to claim 1, wherein:
    the first RF shielding layer extends a distance coextensive with outer dimensions of the first sheet or the second sheet.

11. The system according to claim 1, wherein:
    at least one of the first and second electronic tags is an on-metal NFC tag or on-metal RFID tag.

12. An electronic tag shielding system for a book comprising:
    a book having a plurality of layers of material;
    an on-metal first electronic tag applied to a first layer of the plurality of layers;
    a second electronic tag applied to a second layer of the plurality of layers, the first layer located above the second layer; and a first RF shielding layer disposed between the first and second electronic tags, the RF shielding layer operably covering the second electronic tag,
  wherein in a configuration where the first RF shielding layer covers the second electronic tag, only the first electronic tag is readable by an electronic tag reader in range of the first electronic tag.

13. The system according to claim 12, wherein:
the material includes at least one of printed material and non-printed material.

14. The system according to claim 12, wherein:
the material is formed from at least one of fabric, paper, vinyl, plastic, PVC, metal, wood, nylon and leather.

15. The system according to claim 12, wherein:
the first RF shielding layer is at least equal to the size of the second layer.

16. The system according to claim 12, wherein:
the first RF shielding layer is 5 to 25 percent larger than at least one of the first or second electronic tags.

17. The system according to claim 12, wherein:
the book is formed from printed material bound into a hardcover or softcover work, a magazine, a pamphlet, and a greeting card.

18. The system according to claim 12, wherein:
the first RF shielding layer is conductive.

19. The system according to claim 12, further comprising:
an on-metal third electronic tag applied to a third layer of the plurality of layers, the third layer located between the first and second layers, wherein the first RF shielding layer is located between the second and third electronic tags; and
a second RF shielding layer disposed between the first and third electronic tags, the second RF shielding layer operably covering the third electronic tag.

20. The system according to claim 12, wherein:
the first RF shielding layer extends a distance coextensive with outer dimensions of the first layer or the second layer.

21. The system according to claim 12, wherein:
at least one of the first and second electronic tags is an on-metal NFC tag or on-metal RFID tag.

22. An electronic tag shielding system for a multi-layered product, the system comprising:
  a plurality of layers of printed and/or non-printed material;
  an on-metal first electronic tag applied to a first layer of the plurality of layers;
  a second electronic tag applied to a second layer of the plurality of layers, the first layer located above the second layer; and
  a first RF shielding layer disposed between the first and second electronic tags, the RF shielding layer operably covering the second electronic tag,
  wherein in a configuration where the first RF shielding layer covers the second electronic tag, only the first electronic tag is readable by an electronic tag reader in range of the first electronic tag.

23. The system according to claim 22, further comprising:
an on-metal third electronic tag applied to a third layer of the plurality of layers, the third layer located between the first and second layers, wherein the first RF shielding layer is located between the second and third electronic tags; and
a second RF shielding layer disposed between the first and third electronic tags, the second RF shielding layer operably covering the third electronic tag.

24. The system according to claim 23, wherein:
the material is formed from at least one of fabric, paper, vinyl, plastic, PVC, metal, wood, nylon and leather.

25. The system according to claim 22, wherein:
the first RF shielding layer is conductive.

26. The system according to claim 22, wherein:
at least one of the plurality of layers is a plastic payment card.

27. The system according to claim 22, wherein:
the first and second layers are coupled together.

28. The system according to claim 22, wherein:
at least one of the plurality of layers is a playing card.

29. The system according to claim 22, wherein:
the first RF shielding layer extends a distance coextensive with outer dimensions of the first layer or the second layer.

30. The system according to claim 22, wherein:
at least one of the first and second electronic tags is an on-metal NFC tag or on-metal RFID tag.

31. An electronic tag shielding system for a multi-layered product, the system comprising:
  an upper on-metal first electronic tag;
  a lower second electronic tag located below the upper first electronic tag; and
  an RF shielding layer disposed between the first and second electronic tags, the RF shielding layer operably covering the second electronic tag,
  wherein in a configuration where the RF shielding layer covers the second electronic tag, only the first electronic tag is readable by an electronic tag reader in range of the first electronic tag.

32. The system according to claim 31, wherein the first electronic tag is an on-metal NFC tag or an on-metal RFID tag, and the second electronic tag is an NFC tag or an RFID tag.

33. The system according to claim 31, wherein first electronic tag is directly attached to the RF shielding layer.

34. The system according to claim 31, wherein in a configuration where the second electronic tag is above the first electronic tag and the RF shielding layer covers the first electronic tag, only the second electronic tag is readable by an electronic tag reader in range of the second electronic tag.

* * * * *